United States Patent
Goyal et al.

(10) Patent No.: US 11,586,932 B2
(45) Date of Patent: Feb. 21, 2023

(54) MODEL TRAINING WITH VARIABLE BATCH SIZING AND GRADIENT CHECKPOINT SEGMENTS

(71) Applicant: International Business Machines Corporation, Armonk, NY (US)

(72) Inventors: Saurabh Goyal, New Delhi (IN); Anamitra Roy Choudhury, Vasant Kunj (IN); Yogish Sabharwal, Gurgaon (IN); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/813,818

(22) Filed: Mar. 10, 2020

(65) Prior Publication Data

US 2021/0287094 A1    Sep. 16, 2021

(51) Int. Cl.
  *G06N 3/08*  (2006.01)
  *G06N 3/084*  (2023.01)

(52) U.S. Cl.
  CPC ................... *G06N 3/084* (2013.01)

(58) Field of Classification Search
  CPC ..... G06N 3/084; G06N 3/0445; G06N 3/0454
  See application file for complete search history.

(56) References Cited

U.S. PATENT DOCUMENTS

| | | | | |
|---|---|---|---|---|
| 2012/0065789 A1* | 3/2012 | Scelzi | ................. | G01R 21/133 702/136 |
| 2016/0342890 A1* | 11/2016 | Young | ..................... | G06N 3/08 |
| 2017/0286830 A1 | 10/2017 | El-Yaniv et al. | | |
| 2019/0266015 A1* | 8/2019 | Chandra | ............... | G06F 9/4887 |
| 2020/0008171 A1* | 1/2020 | Jagannathan | ......... | H04L 67/535 |
| 2020/0020098 A1* | 1/2020 | Odry | .................... | G06N 3/0454 |
| 2020/0356809 A1* | 11/2020 | Ghosh | ................... | G06N 3/084 |

FOREIGN PATENT DOCUMENTS

EP        3543917 A1    9/2019

OTHER PUBLICATIONS

Devarakonda et al., "Adabatch: Adaptive Batch Sizes for Training Deep Neural Networks," Feb. 14, 2018, 14 pages, https://arxiv.org/pdf/1712.02029.pdf.

Chakrabarti et al., "Backprop with Approximate Activations for Memory-efficient Network Training," Jan. 23, 2019, 9 pages, https://openreview.net/pdf?id=rJgfjjC9Ym.

Rota Bulo et al., "In-Place Activated BatchNorm for Memory-Optimized Training of DNNs," In-Place Activated BatchNorm for Memory-Optimized Training of DNNs—arXiv Vanity, Oct. 11, 2019, 23 pages, https://arxiv.org/pdf/1712.02616.pdf.

(Continued)

*Primary Examiner* — Jamal Javaid
(74) *Attorney, Agent, or Firm* — Grant Johnson

(57) ABSTRACT

A computer-implemented machine learning model training method and resulting machine learning model. One embodiment of the method may comprise receiving at a computer memory training data; and training on a computer processor a machine learning model on the received training data using a plurality of batch sizes to produce a trained processor. The training may include calculating a plurality of activations during a forward pass of the training and discarding at least some of the calculated plurality of activations after the forward pass of the training.

20 Claims, 12 Drawing Sheets

(56) References Cited

OTHER PUBLICATIONS

Sohoni et al., "Low-Memory Neural Network Training: A Technical Report," Stanford University Paper, Apr. 23, 2019, 38 pages, http://web.stanford.edu/~nims/low_memory_training.pdf.
Choudhury et al., "Dataset Dependent Low Rank Decomposition of Neural Networks," U.S. Appl. No. 16/453,380, filed Jun. 26, 2019.
Hubara et al., "Quantized Neural Networks: Training Neural Networks with Low Precision Weights and Activations," Journal of Machine Learning Research 18 (2018), 30 pages.
Gong et al., "Compressing Deep Convolutional Networks Using Vector Quantization," Under review as a conference paper at ICLR 2015, 10 pages.
Han et al., "Deep Compression: Compressing Deep Neural Networks With Pruning, Trained Quantization and Huffman Coding," Published as a conference paper at ICLR 2016, 14 pages.
Anwar et al., "Structured Pruning of Deep Convolutional Neural Networks," ACM Journal on Emerging Technologies in Computing Systems (JETC), 2017, 11 pages.
Han et al., "EIE: Efficient Inference Engine on Compressed Deep Neural Network," ACM/IEEE 43rd Annual International Symposium on Computer Architecture, 2016, 12 pages.
Rhu et al., "vDNN: Virtualized Deep Neural Networks for Scalable, Memory-Efficient Neural Network Design," 49th Annual IEEE/ACM International Symposium on Microarchitecture, 2016, 13 pages.
Chen et al., "Training Deep Nets with Sublinear Memory Cost," Apr. 22, 2016, 12 pages.
Li et al., "Ternary weight networks," Nov. 19, 2016, 5 pages.
Li et al., "Pruning Filters for Efficient Convnets," Published as a conference paper at ICLR 2017, 13 pages.
Molchanov et al., "Pruning Convolutional Neural Networks for Resource Efficient Inference," Published as a conference paper at ICLR 2017, 17 pages.
Zhu et al., "Trained Ternary Quantization," Published as a conference paper at ICLR 2017, 10 pages.
Bolukbasi et al., "Adaptive Neural Networks for Efficient Inference," International Conference on Machine Learning, 2017, 10 pages.
Teerapittayanon et al., BranchyNet: Fast Inference via Early Exiting from Deep Neural Networks, 23rd International Conference on Pattern Recognition (ICPR), 2016, 7 pages.
Vooturi et al., "Efficient Inferencing of Compressed Deep Neural Networks," Nov. 1, 2017, 10 pages.
Wang et al., "SuperNeurons: Dynamic GPU Memory Management for Training Deep Neural Networks," ACM, vol. 53, No. 1, 2018, 13 pages.
Chen et al., "TVM: An Automated End-to-End Optimizing Compiler for Deep Learning," Oct. 5, 2018, 16 pages.
Guo et al., "AccUDNN: A GPU Memory Efficient Accelerator for Training Ultra-deep Neural Networks," Jun. 20, 2019, 12 pages.
Dean et al., "Large Scale Distributed Deep Networks," Advances in neural information processing systems, 2012, 9 pages.
Chen et al., "Compressing Neural Networks with the Hashing Trick," International Conference on Machine Learning, Jun. 2015, 10 pages.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

FIG. 8 - VBS1

$OPT[i,j,b,mem]$: optimal per-sample time to perform forward computations from layer $L_i$ to $L_j$, wherein the layers $L_i, L_{i+1}, \ldots, L_j$ use a total of at most $mem$ units of memory, and each of the layers $L_i, L_{i+1}, \ldots, L_j$ is computed using batch size at most $b$ $OPTExact[i,j,b,mem]$: optimal per-sample time to perform forward computations from layer $L_i$ to $L_j$, wherein the layers $L_i, L_{i+1}, \ldots, L_j$ use a total of at most $mem$ units of memory, and one of the layers $L_i, L_{i+1}, \ldots, L_j$ is computed using batch size exactly $b$ while the rest with batch size at most $b$ (1) $OPT[i,j,b,mem] = \min_{i \leq k \leq j} \begin{Bmatrix} OPT[i,k-1,b,mem] \\ +OPTExact[k,k,b,mem] \\ +OPT[k+1,j,b,mem] \end{Bmatrix}$ $OPT[i,j,b,mem] = 0$ for $i > j$ (2) $OPT[i,j,b,mem] = \left(\frac{1}{b}\right) \cdot \min_{1 \leq b' \leq b}(b' \cdot OPTExact[i,j,b',mem - in(i,b-b')] + (b-b') \cdot OPT[i,j,b-b',mem - out(i,b')])$ (3) $OPTExact[i,i,b,mem] = \begin{cases} time(i,b), & \text{if } <i,b,mem> \text{ is feasible} \\ \alpha, & \text{else} \end{cases}$

FIG. 9 – VBS2

$OPT[i,j,b,mem]$: optimal per-sample time to perform activation computations from layer $L_i$ to $L_j$, wherein the layers $L_i, L_{i+1}, ..., L_j$ use a total of at most $mem$ units of memory, and each of the layers $L_i, L_{i+1}, ..., L_j$ is computed using batch size at most $b$ $OPTExact[i,j,b,mem]$: optimal per-sample time to perform activation computations from layer $L_i$ to $L_j$, wherein the layers $L_i, L_{i+1}, ..., L_j$ use a total of at most $mem$ units of memory, and one of the layers $L_i, L_{i+1}, ..., L_j$ is computed using batch size exactly $b$ while the rest with batch size at most $b$ (1) $$OPT[i,j,b,mem] = \min_{i \leq k \leq j} \begin{cases} OPT[i, k-1, b, mem] \\ +OPTExact[k, k, b, mem - act(i, k-1)] \\ +OPT[k+1, j, b, mem - act(i,k)] \end{cases}$$

$$OPT[i,j,b,mem] = 0 \quad \text{for} \quad i > j$$

(2) $$OPTExact[i,j,b,mem] = \left(\frac{1}{b}\right) \cdot \min_{1 \leq b' \leq b}(b' \cdot OPTExact[i,j,b',mem] + (b-b') \cdot OPT[i,j,b-b',mem])$$

(3) $$OPTExact[i,i,b,mem] = \begin{cases} time(i,b), & \text{if } <i, b, mem> \text{ is feasible} \\ \alpha, & \text{else} \end{cases}$$

FIG. 10 – VBS3

$OPT[i,j,b,mem]$: optimal per-sample time to perform gradient computations from layer $L_j$ to $L_i$, wherein the layers $L_j, L_{j-1}, \ldots, L_i$ use a total of at most $mem$ units of memory, and each of the layers $L_j, L_{j-1}, \ldots, L_i$ is computed using batch size at most $b$ $OPTExact[i,j,b,mem]$: optimal per-sample time to perform inferencing computations from layer $L_j$ to $L_i$, wherein the layers $L_j, L_{j-1}, \ldots, L_i$ use a total of at most $mem$ units of memory, and one of the layers $L_j, L_{j-1}, \ldots, L_i$ is computed using batch size exactly $b$ while the rest with batch size at most $b$ (1) $$OPT[i,j,b,mem] = \min_{i \leq k \leq j} \begin{cases} OPT[k+1,j,b,mem] \\ + OPTExact[k,k,b,mem + act(k+1,j)] \\ + OPT[i,k-1,b,mem + act(k,j)] \end{cases}$$

$OPT[i,j,b,mem] = 0$ for $i > j$ (2) $$OPT[i,j,b,mem] = \left(\frac{1}{b}\right) \cdot \min_{b \leq b' \leq b} (b' \cdot OPTExact[i,j,b',mem] + (b-b') \cdot OPT[i,j,b-b',mem])$$

(3) $$OPTExact[i,j,b,mem] = \begin{cases} time(i,b), & \text{if } < i,b,mem > \text{ is feasible} \\ \alpha, & \text{else} \end{cases}$$

MODEL TRAINING WITH VARIABLE BATCH SIZING AND GRADIENT CHECKPOINT SEGMENTS

BACKGROUND

The present application generally relates to information technology and, more particularly, to resource management during training of machine learning models.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

One technology that has evolved to take advantage of this new capability is machine learning models, such as the feedforward neural network. Feedforward neural networks have been used extensively over the last decade in applications ranging from computer vision to speech recognition and natural language processing. Many of the recent successful recognition systems are built on top of this architecture.

A simple feedforward neural network comprises a sequence of layers. The number of layers and parameters of a neural network increases with the size of datasets required to implement these models. For example, a typical neural network for image classification may include 16 layers and over 130 million parameters, resulting in a trained model that is over 500 megabytes.

SUMMARY

According to embodiments of the present disclosure, a computer-implemented machine learning model training method. One embodiment may comprise receiving at a computer memory training data; and training on a computer processor a machine learning model on the received training data using a plurality of batch sizes to produce a trained processor. The training may include calculating a plurality of activations during a forward pass of the training and discarding at least some of the calculated plurality of activations after the forward pass of the training. A machine learning model consistent with some embodiments may be created using this method.

According to embodiments of the present disclosure, an inferencing engine, comprising one or more processors coupled to one or more memories. The one or more memories may comprise a machine learning model having a plurality of associated activations, model training data, and program instructions. The program instructions, when executed on the one or more processors, may cause the one or more processors to calculate a plurality of batch sizes and train the machine learning model on the model training data using the calculated plurality of batch sizes. At least some of a plurality of activations of the machine learning model may be discarded during a forward pass of the training.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 illustrates methods for one suitable VBS1 routine, consistent with some embodiments.

FIG. 9 illustrates methods for one suitable VBS2 routine, consistent with some embodiments.

FIG. 10 illustrates methods for one suitable VBS3 routine, consistent with some embodiments.

Figure 1:
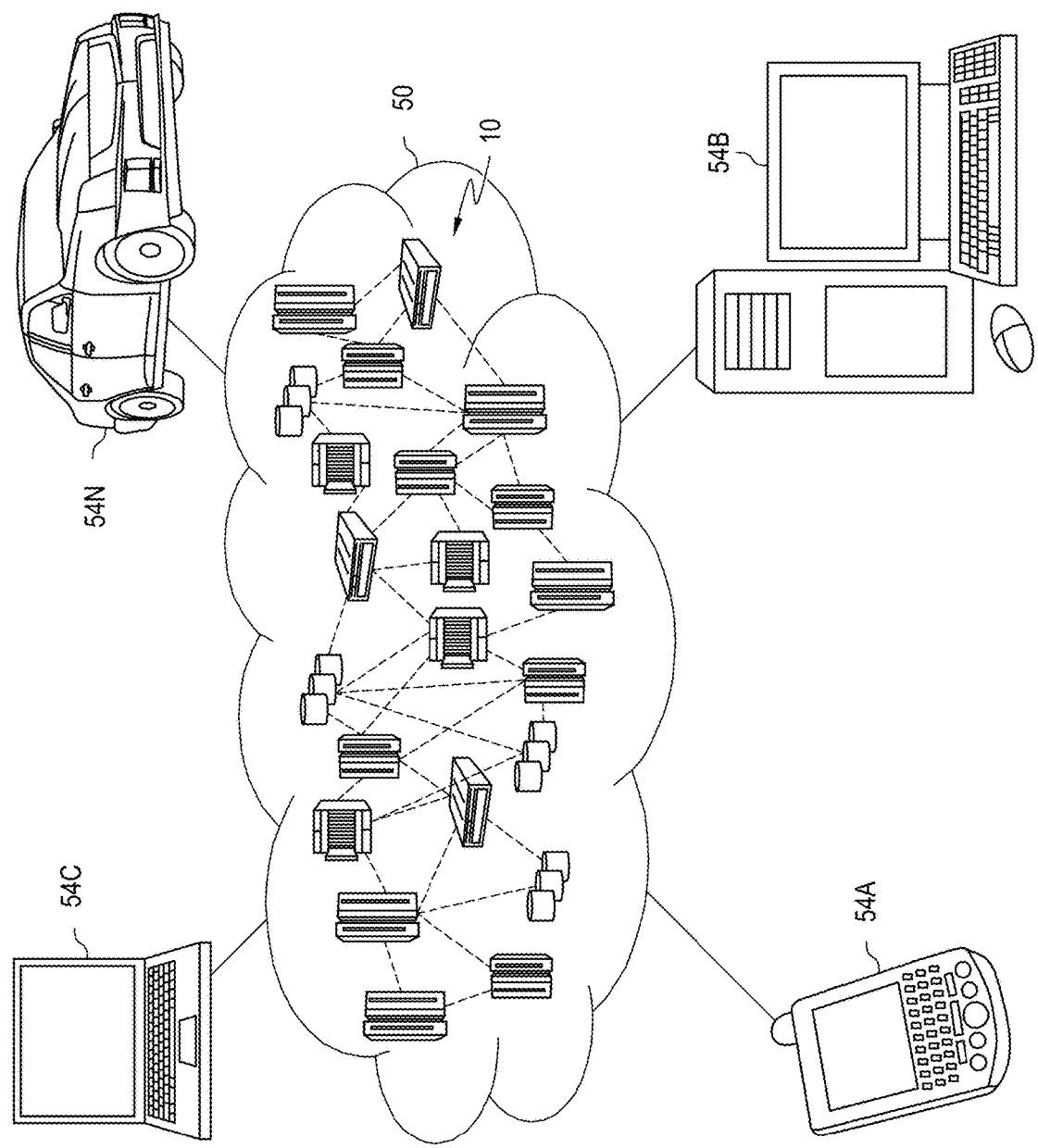
FIG. 1 illustrates a cloud environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present application generally relates to information technology and, more particularly, to resource management during training of machine learning models. While the present disclosure is not necessarily limited to such applications, various aspects of the disclosure may be appreciated through a discussion of various examples using this context.

Today, a large number of Artificial Intelligence (AI) applications rely on using machine learning models, such as a feedforward network, for image classification, speech recognition, natural language understanding, natural language generation and so on. These applications include helping people get information on the building and surroundings around them when on vacation using their mobile phones, as well as voice-based assistants on mobile phones and other home devices.

This trend is likely to continue. Applications in the area of augmented reality involve continuous image recognition with results being reported on a VR display to provide more information about the environment to the individual. For example, in security, this can be used for identity detection. Similarly, in self-driven cars, deep learning models are used to inference in real-time using data collected from a combination of sensing technologies including visual sensors, such as cameras, and range-to-object detecting sensors, such as lasers and radar. Increased instrumentation is also impacting various industries, such as agriculture, manufacturing, renewable energy, and retail that increasingly generate structured and unstructured data, which preferably needs to be analyzed so that real-time action can be taken.

For the scenarios described above, inferencing can be done either on the cloud, on a specific server, or on the edge device itself. However, challenges exist with all three options. For example, the sheer size of the deep learning models and constrained resource availability often make inferencing a challenge on mobile/edge devices. Similarly, offloading inferencing to the cloud or a server can be impractical in lot of situations due to wireless energy overheads, turn-around latencies, and data security reasons. Moreover, even when inferencing is done on the cloud, resources have to be efficiently utilized to keep the cost of inferencing at a minimum for the cloud vendor as the cost of inferencing indirectly dependent on resource utilization. For example, a vendor providing "inferencing as a service" for image classification may want to keep hundreds of deep learning models customized for various domains and users in memory in order to provide the low response time, which in turn, can require considerable computing resources.

Accordingly, some embodiments of this disclosure may employ gradient checkpointing to use computing resources more efficiently. In operation, these embodiments drop some of the intermediate results generating during training, and then recover the dropped intermediate results when needed by re-running forward from the closest recorded results. These embodiments may be desirable because they allow for bigger models and enable larger training batch sizes.

Some embodiments of this disclosure may further employ variable batch size at each phase of the gradient checkpointing process to further improve use computing resources during training. Moreover, because the available memory may vary dynamically depending on the system load, the optimal batch size for achieving the maximum throughput may be calculated at the time of inferencing. In addition, because the memory requirement and the computation time for inferencing varies with the layers even for a fixed batch size, some embodiments may use different batch sizes for each layer of the machine learning model.

Cloud Computing

FIG. 1 illustrates an embodiment of a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3 resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
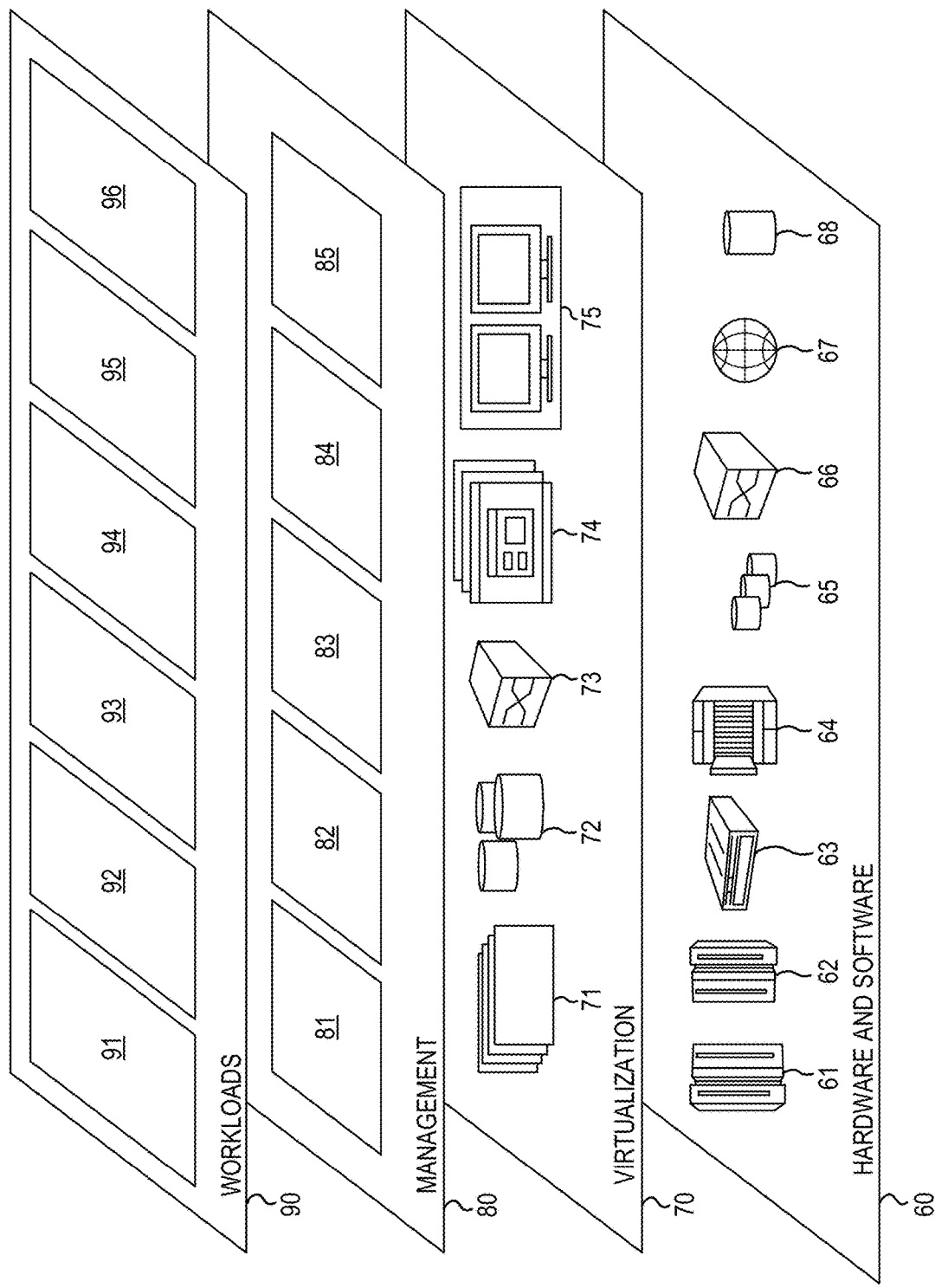
FIG. 2 illustrates a set of functional abstraction layers provided by cloud computing environment, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inferencing engine 96.

Data Processing System

Figure 3:
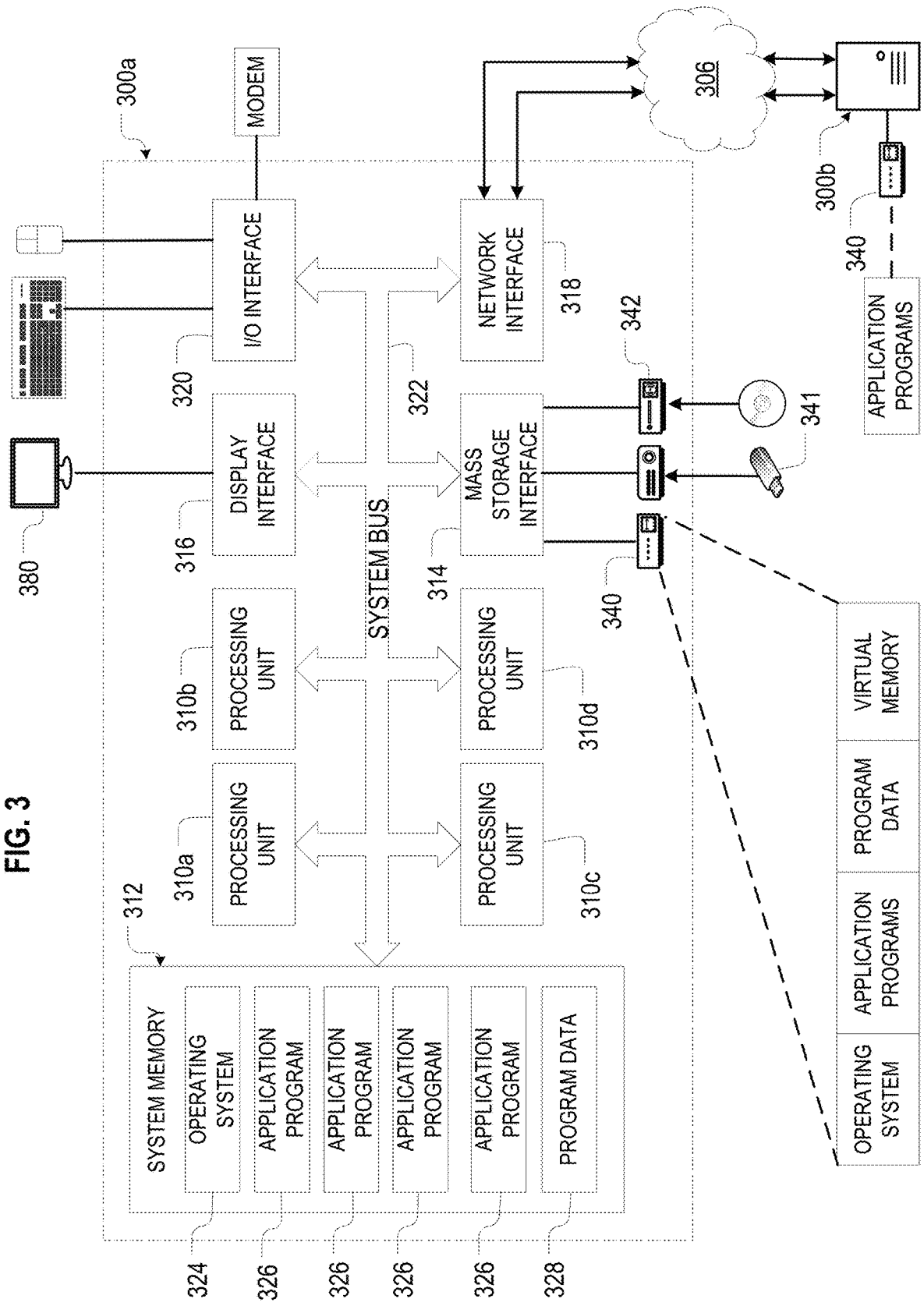
FIG. 3 illustrates an embodiment of a data processing system suitable for use in a cloud environment, consistent with some embodiments.

FIG. 3 illustrates an embodiment of a data processing system (DPS) 300 suitable for use in a cloud environment, such as cloud computing environment 50. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Model Training

The machine learning models ("ML models") in some embodiments may be any software system that enables a system to learn from data rather than through explicit programming. One example of a machine learning model that will be used for illustrative purposes is a feedforward neural network.

In some embodiments, the ML models may comprise a plurality of artificial neurons interconnected through connection points called synapses. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., speech recognition) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. The layer that receives external data is the input layer. The layer that produces the ultimate result is the output layer. Same embodiments may include hidden layers between the input and output layers, and commonly include dozens or hundreds of such hidden layers.

Figure 4:
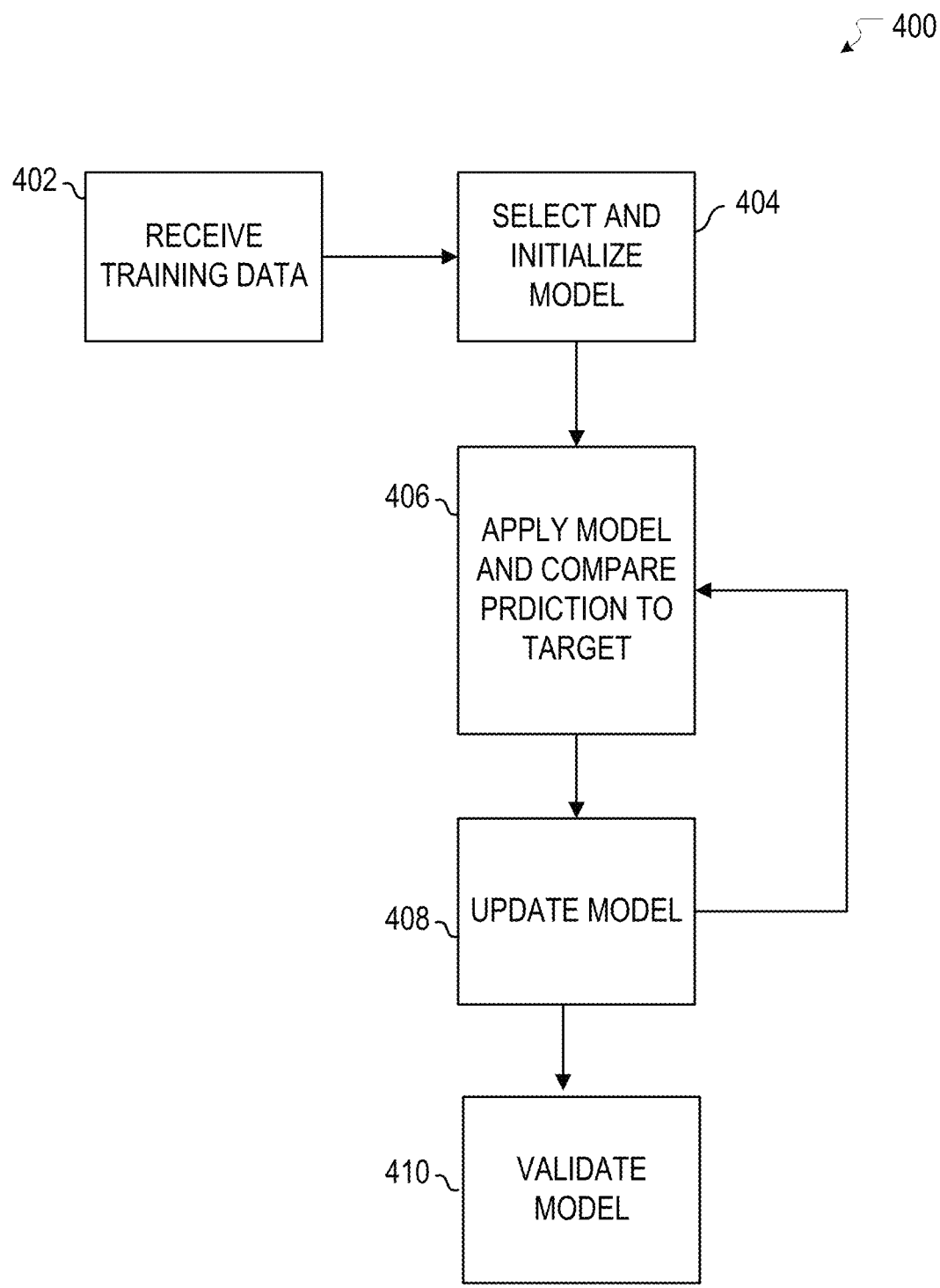
FIG. 4 illustrates one ML training method that may be applicable to some of the embodiments described herein.

FIG. 4 illustrates one ML training method 400 that may be applicable to some of the embodiments described herein, described with reference to speech recognition as an illustrative example. At operation 402, the DPS 300 may receive training data. In one illustrative example, or use case, the input dataset may include recorded television audio and the target dataset may include manually-transcribed close caption data. At operation 404, the training data may be prepared to reduce sources of bias, typically including de-duplication, normalization, and order randomization. At operation 404, a model may be chosen for training and the initial synaptic weights are randomized. Depending on the underlying task, suitable models that may be chosen include, but are not limited to, feedforward techniques (e.g., convolutional neural networks), regulatory feedback-based systems, radial basis function (RBF) techniques, and recurrent neural network-based techniques (e.g., long short-term memory). At operation 406, the selected model may be used to predict an output using the input data element, and that prediction is compared to the corresponding target data. The gradient (e.g., difference between the predicted value and the target value) may then be used at operation 408 to update the synaptic weights. This process may repeat, with each iteration updating the weights, until the training data is exhausted, or the model reaches an acceptable level of accuracy and/or precision. At operation 410, the resulting model may optionally be compared to previously unevaluated data to validate and test its performance.

Figure 5A:
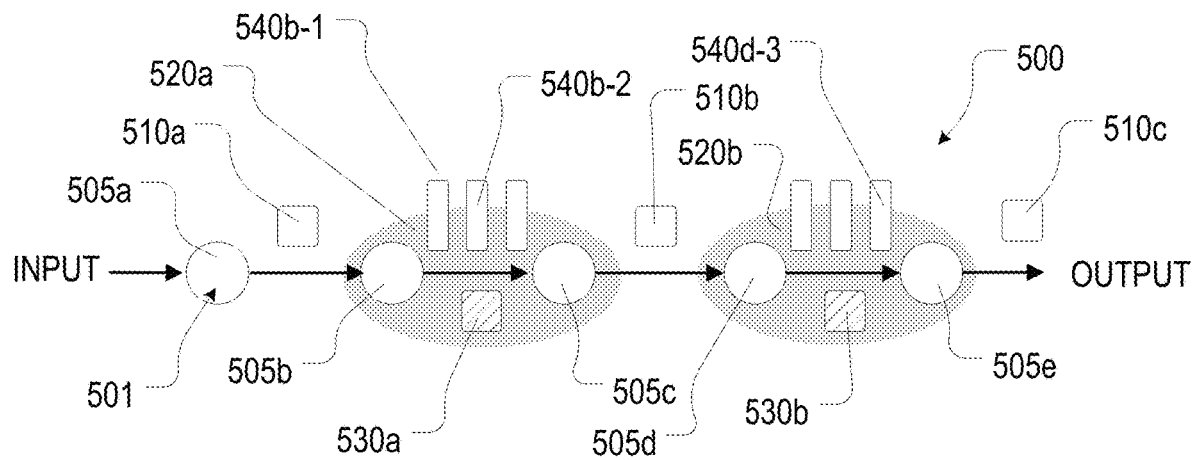
FIG. 5A is a conceptual illustration of a ML model training method with gradient checkpointing, consistent with some embodiments.

FIG. 5A is a conceptual illustration of an ML model training method with gradient checkpointing with variable batch sizes across different layers 500, consistent with some embodiments. This training method 500 is illustrated on a sample model 501 comprising: five layers 505a-505e; three permanently stored activations 510a, 510b, 510c; and two temporary activations 530a, 530b. Each layer 505a-505e may, in turn, comprise one or more sublayers 540 (only some drawn and/or labeled for clarity). In the illustrated method 500, the temporary activations 530a, 530b for segments 520a and 520b (and/or associated sublayers 540b-1 to 540b-3 and 540d-1 to 540d-3) may be discarded after each use. That is, in some embodiments, the method 500 only permanently stores the activations 510a, 510b, 510c at certain, predefined stages in the forward pass, discards the other activations 530a, 530b after use, and recomputes the missing/discarded activations 530a, 530b when needed again (e.g., during back-propagation). In this way, the method 500 will only require enough physical memory to hold the permanently stored activations 510a, 510b, 510c and the temporary activations 530a, 530b required for the particular segment 520a, 520b currently being calculated or adjusted during the back-propagation method. These embodiments may be desirable for some applications because they may have lower memory requirements, albeit at the expense of longer training time and overhead.

Figure 5B:
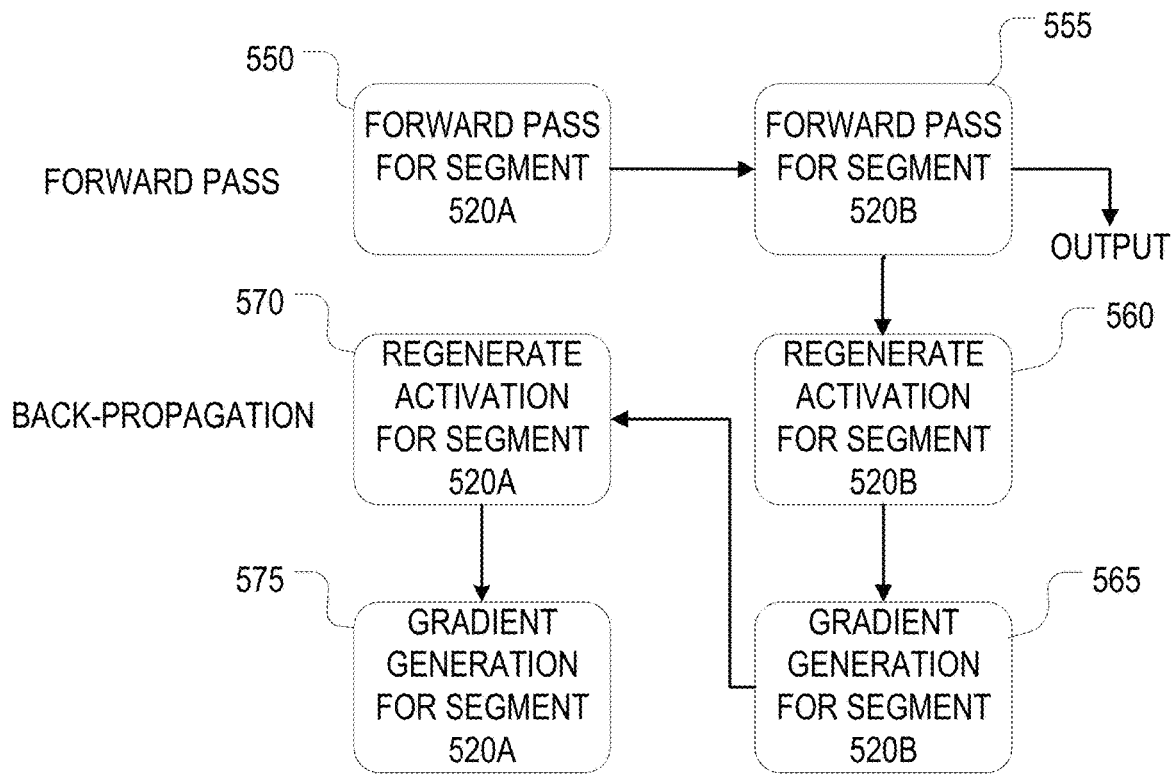
FIG. 5B is a flow chart showing the training method in operation, according to some embodiments.

FIG. 5B is a flow chart showing the training method 500 in operation, according to some embodiments. At operation 550, the DPS 300 may calculate the activation 530a during the forward pass for segment 520a using the permanently stored activation 510a. The DPS 300 may also use the temporary activation 530a to calculate permanent activation 510b, and then discard the temporary activation 530a. At operation 555, the DPS 300 may calculate the activation 530b during the forward pass for segment 520b using the permanently stored activation 510b. The DPS 300 may also use the temporary activation 530b to calculate permanent activation 510c, and then discard the temporary activation 530b. The DPS 300 may then generates a training model output at the end of the forward pass.

The DPS 300 may then begin the back-propagation process. At operation 560, the DPS 300 may regenerate the temporary activation 530b for segment 520b using the permanently stored activation 510b. At operation 565, the DPS 300 generates the error gradients for segment 520b and then discard the temporary activation 530b. In some embodiments, this may comprise calculating both a direction and a magnitude of the error that occurs during training of the machine learning model 501. Also, at operation 565, the error gradients are applied to update the activation 510c in the right direction and by the right amount.

At operation 570, the DPS 300 may regenerate the temporary activation 530a for segment 520a using the permanently stored activation 510a. At operation 575, the DPS 300 generates the error gradients for segment 520a and then discard the temporary activation 530a. In some embodiments, this may comprise calculating both a direction and a magnitude of the error that occurs during training of the machine learning model 501. Also, at operation 575, the error gradients are applied to update the activation 510b in the right direction and by the right amount.

Figure 6:
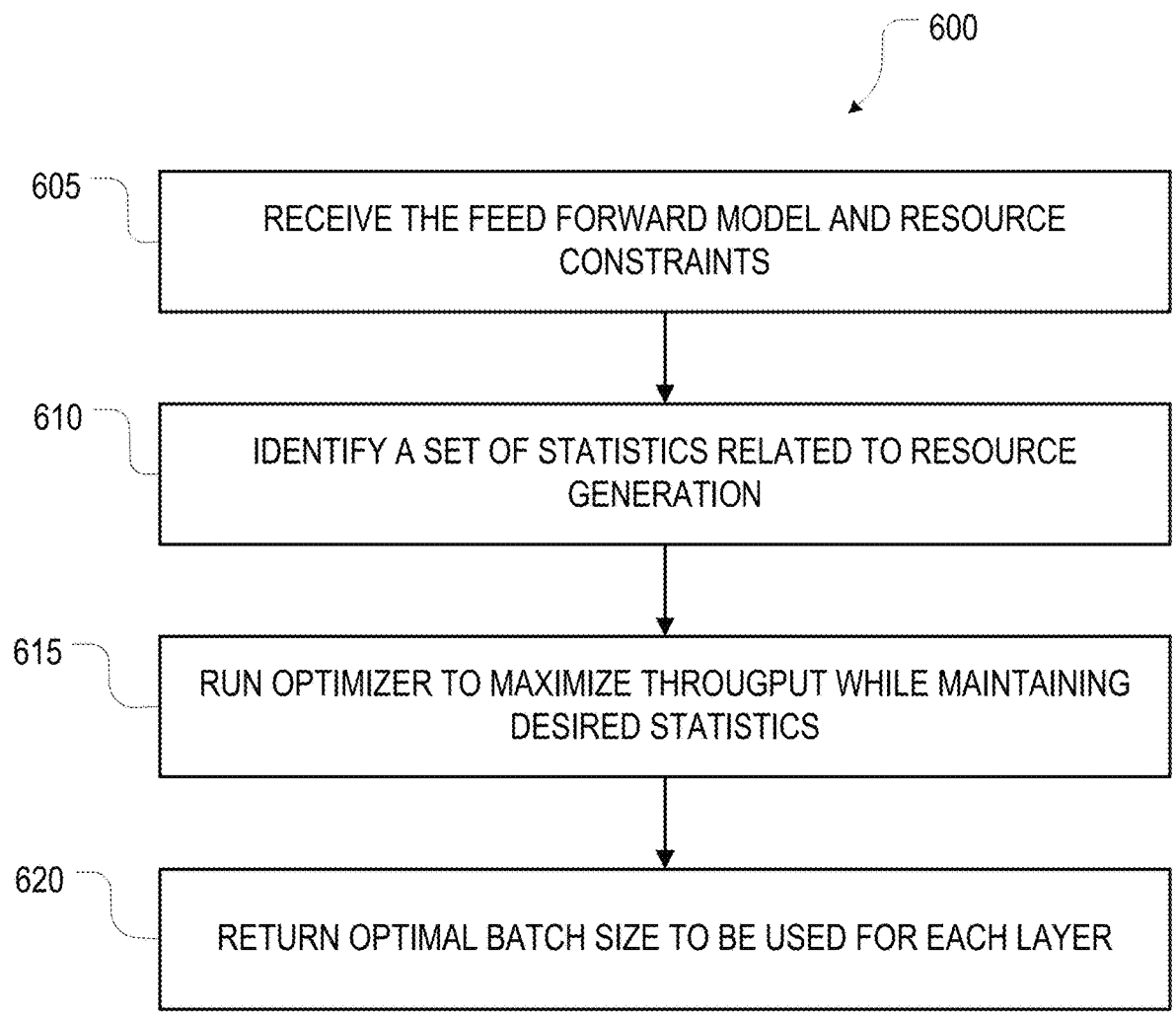
FIG. 6 is a high level flow chart illustrating one method of training a model using variable block sizes, consistent with some embodiments.

FIG. 6 is a high level flow chart illustrating one method 600 of training a model using variable block sizes at some or all of the operations described with reference to FIG. 5B (i.e., at operations 550, 555, 560, 565, 570, and 575), consistent with some embodiments. Embodiments using variable bock sizes may be desirable because they may improve throughput while restricting memory usage. More specifically, larger batch sizes may often be desirable because they allow for better performance via cache recuse, etc. Batch sizes, however, may be practically constrained by available system resources, such as the system's available physical memory, or other design goals, such as energy use. Some embodiments may mitigate this limit by calculating and using a custom batch size for each layer. In this way, layers having low resource requirements may utilize larger batch sizes, while layers having higher resource requirements may use smaller resource requirements.

At operation 605, the DPS 300 may receive the feedforward model and the resource constraints. At operation 610, this information may be preprocessed to calculate a set of statistics related to resource utilization (e.g., working memory, input and activation size for each sample, time/energy to process the layer for each permissible batch size, etc.) At operation 615, an optimizer may be run against the calculated statistics to calculate a batch size for each layer that maximizes throughput, while maintaining latency/memory/energy constraints. At operation 620, the optimized batch size to be used for each layer for the one or more phases in the training may be returned.

Figure 7A:
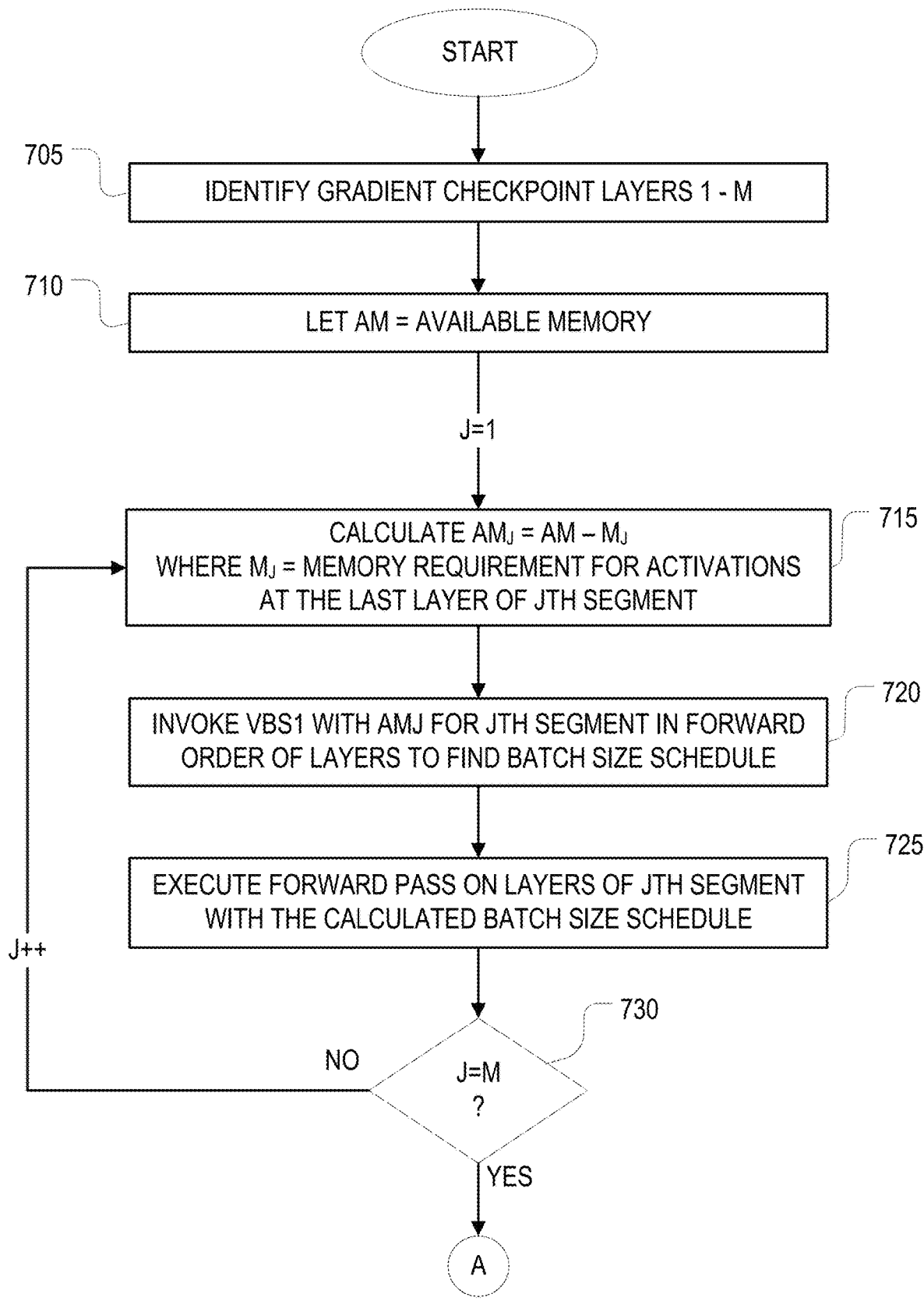
FIGS. 7A-7B collectively are a flow chart illustrating some operations in more detail, consistent with some embodiments.
Figure 7B:
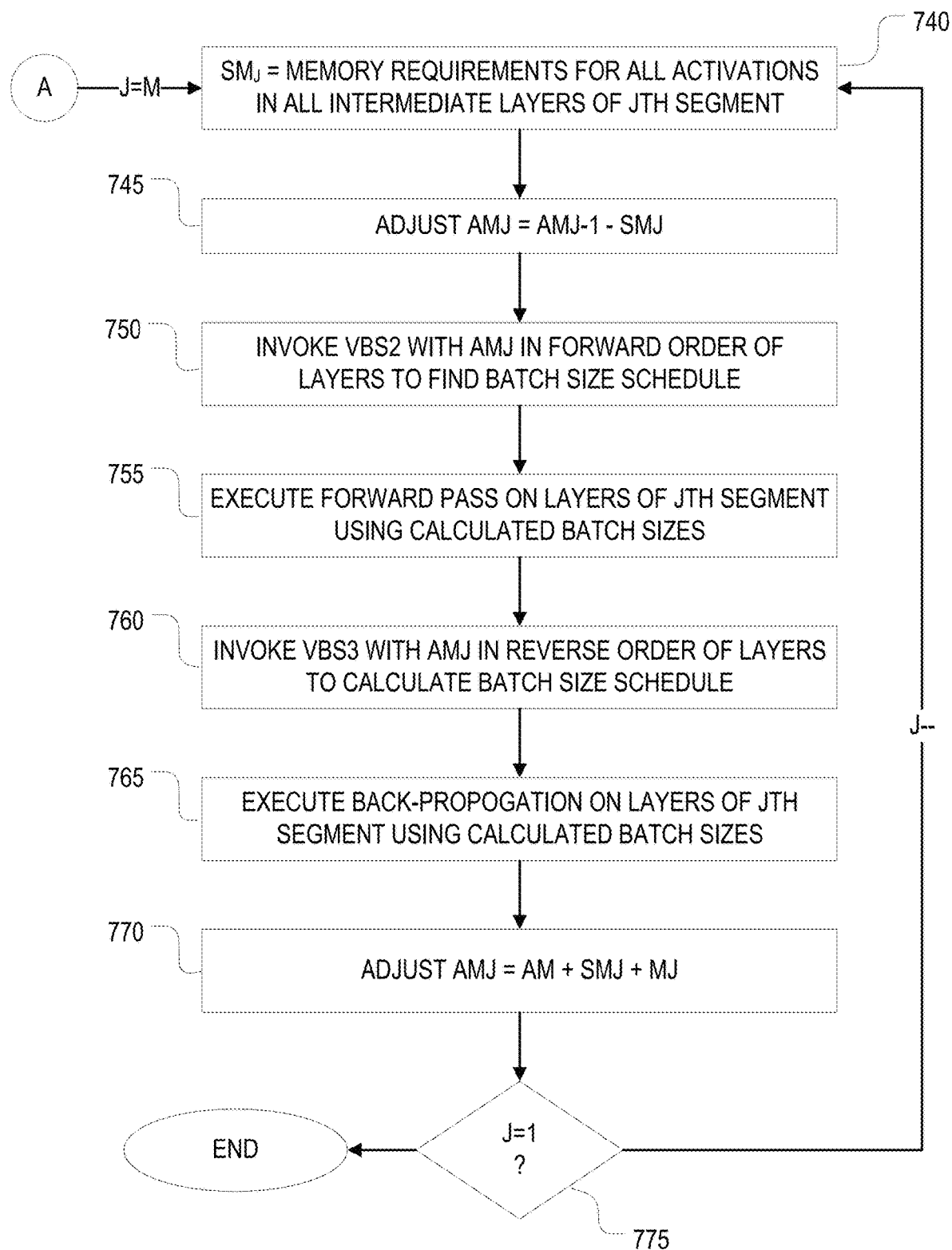

FIGS. 7A-7B collectively are a flow chart illustrating operations 610 and 615 in more detail, consistent with some embodiments. At operation 705, the DPS 300 may determine a number of segments that do not have stored activations, and then sets a variable 'm' to be the number of such segments. At operation 710, the DPS 300 may determine the currently available memory (AM) for model training.

Next, the DPS 300 iterates through the 'm' segments without stored activations (i.e., via counter 'j' from 1 to m). At operation 715, the DPS 300 may calculate the memory requirement ($M_j$) for activations at the last layer of segment 'j.' The available memory for the 'jth' segment in some embodiments may equal to $$AM = \sum_{p=1}^{j} M_p$$

where Mj is the physical memory required for activations at the last layer of the 'jth' segment. As this formula suggests, the available memory reduces as j increases. Thus for j=1, used up memory=M1, for j=2, used up memory=M1+M2. Put differently, for j=1, available memory becomes reduced to AM=AM−M1, (note that now AM is the reduced amount), and for j=2, available memory gets further reduced by M2, so AM (now)=AM (after j=1)−M2.

The DPS 300 may then invoke the VBS1 variable block size routine in the forward order of sublayers to calculate an optimized batch size schedule for the forward pass at operation 720, using the calculated $AM_j$ as input. One suitable VBS1 routine is illustrated in FIG. 8. At operation 725, the DPS 300 may execute the forward pass on the layers of the 'jth' segment with the batch size schedule calculated at operation 715. The DPS 300 may then determine at operation 730 whether there are any additional segments to process. If so, the DPS 300 returns to operation 715, otherwise it proceeds to operation 740.

The DPS 300 in this embodiment may begin the back-propagation calculation at operation 740 by determining the memory requirement ($SM_j$) for activations in all intermediate layers of the 'jth' segment. At operation 745, the DPS 300 may adjust the available memory for the 'jth' segment to be $BM_j = AM_j − SM_j$. Next, operation 750, the DPS 300 may invoke the VBS2 variable block size routine, with the calculated $BM_j$ as input, in a forward order of sublayers to calculate an optimized batch size schedule for the regeneration pass on the 'jth' segment. In some embodiments, the VBS2 routine may be defined as shown in FIG. 9. The DPS 300 may then (re)execute the forward pass on the layers of the 'jth' segment at operation 760 in accordance the calculated batch size schedule to regenerate the previously discarded activations.

At operation 770, the DPS 300 may invoke the VBS3 variable block size routine with BMj for the 'jth' segment in reverse order of sublayers to calculate an optimized batch size schedule for gradient calculations. In some embodiments, the VBS3 routine may be defined as shown in FIG. 10. At operation 765, the DPS 300 may execute back-propagation on the layers of the jth segment following the calculated batch size schedule calculated at operation 760. At operation 770, if any checkpointed segments remain to be processed, the DPS 300 returns to block 740. Otherwise, the method ends.

FIGS. 8, 9, and 10 illustrate methods for suitable VBS1, VBS2, and VBS3 routines, consistent with some information. These methods may be desirable for some applications because they may calculate optimal batch size sequences to be used by the different layers and/or sublayers of the machine learning model during training that maximize throughput using a dynamic program approach (i.e., equations (1), (2) and (3) in FIGS. 8-10). However, other embodiments may optimize based on other metrics, such as minimum energy use, minimum energy cost, or minimum training time. These metrics may be configured for the specific hardware on which the training will be performed e.g., cache size and power usage of specific processors. Still other embodiments may optimize based on a multi-factor cost function, such as 80% throughput and 20% processor time.

Figure 11:
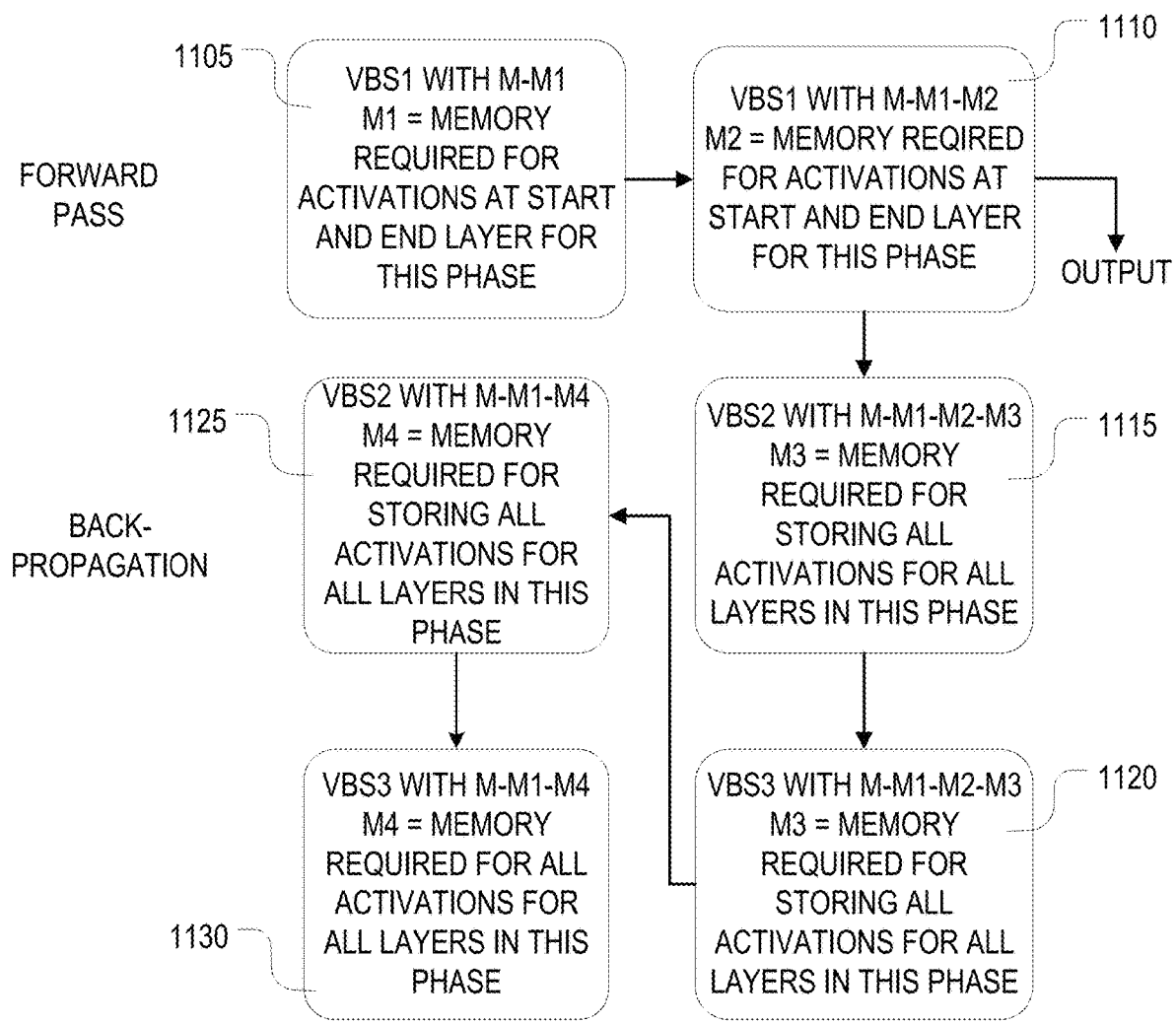
FIG. 11 is a flow chart illustrating the one method of calculating available memory, consistent with some embodiments.

FIG. 11 is a flow chart illustrating the one method of calculating available memory, using the training model 500 of FIG. 5 as illustration, consistent with some embodiments. One advantage of this method is that the available memory can be independently calculated at each operation, thus permitting optimal batch sizes. At operation 1105, the DPS 300 may calculate the activations during the forward pass for segment 520a. In this embodiment, VBS1 may be invoked, with an available memory equal to M−M1, where M1 is the memory required for activations at the start and end of this phase. At operation 1110, the DPS 300 may calculate the activations during the forward pass for segment 520b. VBS1 may again be invoked, with the available memory now equal to M−M1−M2, with M2 being the memory required for activations at the start and end of this phase. At operation 1115, the DPS 300 may regenerate the activations during back-propagation for segment 520b. VBS2 may be invoked, with an available memory equal to M−M1−M2−M3, where M3 is the memory required for storing all activations for all layers in this phase. At operation 1120, the DPS 300 may calculate and apply the error gradients to segment 520b. VMS3 may be invoked, with the available memory again equal to M−M1−M2-M3.

At operation 1125, the DPS 300 may regenerate the activations during back-propagation for segment 520a. VBS2 may be invoked, with the available memory equal to M−M1−M4, where M4 is the memory required for storing all activations for all layers in this phase. At operation 1130, the DPS 300 may calculate and apply the error gradients to update the model weights for segment 520a. VBS3 may be invoked, with the available memory again equal to M−M1−M4.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Inferencing as a Service

Some embodiments may be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Although the above embodiments each have been described by stating their individual advantages, respectively, these embodiments are not limited to a particular combination thereof. To the contrary, some embodiments may also be combined in any way and number according to the intended deployment of those embodiments without losing their beneficial effects.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented machine learning model training method, comprising:
   receiving, at a computer memory, training data; and
   calculating an optimized batch size schedule, wherein the optimized batch size schedule comprises a plurality of batch sizes;
   training, on a computer processor, a machine learning model on the received training data using the optimized batch size schedule to produce a trained processor, wherein training includes:
   calculating a plurality of activations during a forward pass of the training; and
   discarding at least some of the calculated plurality of activations after the forward pass of the training.

2. The method of claim 1, wherein calculating the optimized batch size schedule comprises calculating an optimized batch size schedule for the forward pass of the training.

3. The method of claim 1, wherein calculating the optimized batch size schedule comprises calculating an optimized batch size schedule for an activation regeneration pass of the training.

4. The method of claim 1, wherein calculating the optimized batch size schedule comprises calculating an optimized batch size schedule for a gradient generation pass of the training.

5. The method of claim 1, wherein calculating the optimized batch size schedule comprises:
   calculating a first optimized batch size schedule for the forward pass of the training;
   calculating a second optimized batch size schedule for an activation regeneration pass of the training; and
   calculating a third optimized batch size schedule for a gradient generation pass of the training.

6. The method of claim 5, wherein the first optimized batch size schedule, the second optimized batch schedule, and the third optimized batch size schedule are calculated independently.

7. The method of claim 1, wherein the training comprises:
   calculating one of the plurality of activation for each of a plurality of layers of the machine learning model during the forward pass of the training;
   discarding one or more of the calculated activations after completion of the forward pass; and
   regenerating the one or more discarded activations during a back-propagation pass.

8. The method of claim 1, further comprising:
   metering use of memory associated with the training; and
   generating an invoice based on the metered use.

9. The method of claim 1, wherein the machine learning model comprises a feedforward network.

10. A computer-implemented machine learning model training method, comprising:
    receiving, at a computer memory, training data; and
    training, on a computer processor, a machine learning model on the received training data using a plurality of batch sizes to produce a trained processor, wherein training includes:
    calculating one of the plurality of activation for each of a plurality of layers of the machine learning model during the forward pass of the training;
    discarding one or more of the calculated activations after completion of the forward pass; and
    regenerating the one or more discarded activations during a back-propagation pass.

11. The method of claim 10, wherein the training further comprises:
    identifying one or more segments for which activation checkpoints must be regenerated; and
    calculating available memory for each of the one or more segments.

12. The method of claim 11, further comprising calculating an optimal batch size schedule for each of the one or more segments using the calculated available memory.

13. The method of claim 12, further comprising independently calculating an optimal batch size schedule for the forward pass of the training and a back-propagation pass of the training using the calculated available memory for each of the one or more segments.

14. The method of claim 13, wherein the calculated optimal batch schedules maximize throughput through the segment.

15. An inferencing engine, comprising:
one or more processors coupled to one or more memories, the one or more memories comprising:
a machine learning model having a plurality of associated activations;
model training data; and
program instructions that, when executed on the one or more processors, cause the one or more processors to:
calculate an optimized batch size schedule, wherein the optimized batch size schedule comprises a plurality of batch sizes;
train the machine learning model on the model training data using the calculated optimized batch size schedule, wherein at least some of a plurality of activations of the machine learning model are discarded during a forward pass of the training.

16. The inferencing engine of claim 15, further comprising program instructions that, when executed on the one or more processors, cause the one or more processors to:
calculate a first optimized batch size schedule for the forward pass of the training;
calculate a second optimized batch size schedule for an activation regeneration pass of the training; and
calculate a third optimized batch size schedule for a gradient generation pass of the training.

17. The inferencing engine of claim 16, wherein the first optimized batch size schedule, the second optimized batch schedule, and the third optimized batch size schedule are calculated independently.

18. The inferencing engine of claim 15, further comprising program instructions that, when executed on the one or more processors, cause the one or more processors to:
identify one or more segments for which activation checkpoints must be regenerated;
calculate available memory for each of the segments.

19. The inferencing engine of claim 18, further comprising program instructions that, when executed on the one or more processors, cause the one or more processors to:
calculate an optimal batch size schedule for each of the one or more segments using the calculated available memory.

20. The inferencing engine of claim 15, wherein the calculated optimal batch size schedules maximize throughput through the segment.

* * * * *